United States Patent [19]

Sakamoto et al.

[11] Patent Number: 4,834,448

[45] Date of Patent: May 30, 1989

[54] STRUCTURE FOR MOUNTING ROOF CARRIERS ON A ROOF OF MOTORCAR

[75] Inventors: Toshinori Sakamoto, Higashihiroshima; Kiyoshige Yamada, Aki, both of Japan

[73] Assignee: Mazda Motor Corporation, Hiroshima, Japan

[21] Appl. No.: 163,852

[22] Filed: Mar. 3, 1988

[30] Foreign Application Priority Data

Mar. 3, 1987 [JP] Japan ................................ 62-46879
Mar. 3, 1987 [JP] Japan ................................ 62-46880

[51] Int. Cl.$^4$ ............................................ B62D 25/06
[52] U.S. Cl. .................................. 296/210; 296/37.7; 224/309
[58] Field of Search ........................... 296/210, 37.7; 224/309 X, 42-42 R

[56] References Cited

U.S. PATENT DOCUMENTS

| 3,719,313 | 3/1973 | Tischler | 224/309 |
| 4,364,498 | 12/1982 | Kuus et al. | 224/309 |
| 4,417,762 | 11/1983 | Imai et al. | 296/210 |
| 4,618,181 | 10/1986 | Tokuda et al. | 296/210 |

FOREIGN PATENT DOCUMENTS

| 2939671 | 4/1981 | Fed. Rep. of Germany | 296/210 |
| 59-39245 | 3/1984 | Japan | |

Primary Examiner—Robert R. Song
Attorney, Agent, or Firm—Wenderoth, Lind & Ponack

[57] ABSTRACT

A structure for detachably mounting roof carriers to a motorcar roof including a pair of roof side rails each formed by joining a roof side outer panel and a roof side inner panel together at their outer and inner ends, and a main roof panel joined at each side thereof to the inner end of the roof side rail in a superposed relation, has a vertical wall formed by bending each side end portion of the main roof panel upwardly so as to extend along the joint portion between the roof side rail and the main roof panel, and a fixing portion provided on the vertical wall for detachably fixing a mounting bracket of the roof carrier.

13 Claims, 8 Drawing Sheets

STRUCTURE FOR MOUNTING ROOF CARRIERS ON A ROOF OF MOTORCAR

BACKGROUND OF THE INVENTION

1. Field of the Invention

The present invention relates to a structure for mounting roof carriers on the roof of a motorcar and, more particularly, to a structure for detachably mounting roof carriers on the roof of a motorcar in which fixing portions at which mounting brackets of the roof carriers are fixed are directly formed on the car roof.

2. Description of the Prior Art

In recent years, the surface of a car body has been designed to become as aerodynamic as possible in order to reduce an air resistance coefficient. As a result of the latest in such developments, a car roof as shown in FIG. 1 which is known as a "Mohican" roof has been often employed.

The Mohican roof has roof side rails 2 forming an outer shell of the car body roof 1 and respectively extend in the longitudinal direction of the car on both sides of the car roof 1, and a main roof panel 3 spanning both roof side rails 2 so as to extend in the central area of the car body, both side edges of the main roof panel 3 being welded to the inner edges 2a of the roof side rails 2. One of the external features of the Mohican roof is that on the sides of the car body roof 1 there are not any weather strips which, if provided, would project further outwardly of the roof side rail 2 for the purpose of draining water such as rain water or the like.

Accordingly, as far as the Mohican roof is concerned, a mounting bracket 4a of a roof carrier 4 cannot be detachably fixed to the roof when a weather strip is used. In view of such inconvenience, a fixing portion 5 for the mounting bracket 4a of the roof carrier 4 has been provided on the car body roof 1 in order to assure that mounting bracket 4a can be detachably fixed directly to the fixing portion 5.

Specifically, as shown in FIG. 1, a joint 6 at which the inner edge 2a of the roof side rail 2 is joined to the side edge 3a of the main roof panel 3 is depressed in the longitudinal direction of the car body to form a longitudinally extending groove 7, and the mounting bracket 4a of the roof carrier 4 is placed on the bottom surface defining the longitudinal groove 7. A hole 9 is drilled through the joint 6 in alignment with the location at which the foot 4a of the roof carrier 7 is disposed, and a nut 10 is welded on the lower surface of the joint 6 in alignment with the hole 9 to form the fixing portion 5. Thus, when the roof carrier 4 is mounted on the car body roof, the foot 4a of the roof carrier 7 is fastened directly onto the car roof 1 with the use of a bolt 8.

As mentioned above, the roof side rail 2 is a structural member (side member) of the car body and it includes a hollow space which is formed in a manner in which a roof side outer panel 11 is fixedly secured to a roof side inner panel 12, their inner ends 11a and 12a as well as at their outer ends 11b and 12b being superposed.

Accordingly, the joint 6 at which the roof side rail 2 is joined to the main roof panel 3 is constructed so that the inner end 11a of the roof side outer panel 11 is superposed on the inner end 12a of the roof side inner panel 12 and the side edge 3a of the main roof panel 3 is superposed on the inner end 11a of the roof side outer panel 11. These three panels 3, 11 and 12 are welded together one above the other when the car body roof 1 is assembled.

On the other hand, the fixing portion 5 which is to extend in the longitudinal groove 7 of the joint portion 6 is not formed after the car roof 1 is assembled but is formed in a manner in which the hole 9 through which the bolt 8 is inserted is previously formed through each of the panels 3, 11 and 12, the nut 10 is welded to the lower surface of the roof side inner panel 12, the hole 9 on each of the panels 3, 11 and 12 is aligned with the nut 10 when the car body roof 1 is assembled, and the three panels 3, 11 and 12 are then welded together. Since the fixing portion 5 for detachably fixing the foot 4a of the roof carrier 4 is formed in the above-described manner, the degree of accuracy required for positioning the three members of the panels 3, 11 and 12 is relatively high. Consequently, the operational efficiency of assembling the car body roof 1 is relatively low and thus productivity, is also relatively low.

Furthermore, when the roof carrier 4 is mounted, a load exerted by the dead weight of the roof carrier 4 is concentrated on the fixing portion 5 in the longitudinal groove 7 via the mounting bracket 4a, causing a peripheral portion surrounding the fixing portion 5 to be distorted. Thus, there a problem arises with respect to the strength of the car roof 1.

Incidentally, the present assignee has proposed, as disclosed in Japanese Laid-Open Utility Model No. 39245/1984 entitled "Roof Carrier Device for a Motorcar", that a carrier base member be fixedly provided substantially over the entire length of the longitudinal groove with the mounting bracket of the roof carrier fixed to the carrier base member. Although this proposed structure assures sufficient strength, a long carrier base member is required as a reinforcement member. Furthermore, the operational efficiency of assembling of the car body roof still remains relatively low.

SUMMARY OF THE INVENTION

The present invention has been made with the forgoing background in mind and its object resides in providing a structure for detachably mounting a mounting bracket of a roof carrier directly on a roof of a motorcar wherein a relatively low degree of positional accuracy is required during the assembling of the roof, resulting in a relatively high degree of productivity being assured.

To accomplish the above-described object, the present invention provides a structure for detachably mounting roof carriers on a motorcar roof including a roof side rail formed by joining a roof side outer panel and a roof side inner panel together in a superposed relation at their inner and outer ends, the roof side rail extending in the longitudinal direction of the car body on each side thereof, and a main roof panel joined at a side end thereof to the inner end of the roof side rail in a superposed relation. The structure comprises a vertical wall formed by bending each side end portion of the main roof panel upwardly in the vertical direction of the motorcar, the vertical wall extending along the joint at which the main roof panel is joined to the roof side rail, and a fixing portion provided on the vertical wall for detachably fixing a mounting bracket of the roof carriers.

In the structure for detachably mounting a roof carrier on a motorcar according to the invention, the fixing portion for detachably fixing a mounting bracket of each of the roof carriers is provided on the vertical wall of the main roof panel. Accordingly, there is no need to take into account correct positioning of the fixing portion during the assembling of the roof, even though the fixing portion is formed on the main roof panel before its assembly. This allows a relatively low degree of accuracy to be sufficient for positioning when panels constituting the car roof are joined one above another in a superposed relation.

Preferably, the structure of the invention includes a longitudinal groove extending along the joint of the roof side rail and the main roof panel so that the lower end of the mounting bracket of the roof carrier is placed on the bottom surface of the groove.

In one embodiment of the invention, one of the roof side inner and outer panels has an extension extending from the inner end thereof along the vertical wall of the main roof panel. The extension is secured to the inner surface of the vertical wall in a superposed relation at least at the fixing portion of the roof carrier. In this case, it is necessary to correctly position the main roof panel relative to one of the roof side panels. However, with the present invention, operational efficiency and productivity are relatively high, compared with the conventional structure which requires correct positioning of three panels.

These and other objects, features and advantages of the invention will become readily apparent from the following description which has been made with reference to the accompanying drawings.

DETAILED DESCRIPTION OF THE PREFERRED EMBODIMENTS

Now, the present invention will be described in greater detail with reference to the accompanying drawings which illustrate preferred embodiments thereof.

Figure 1:
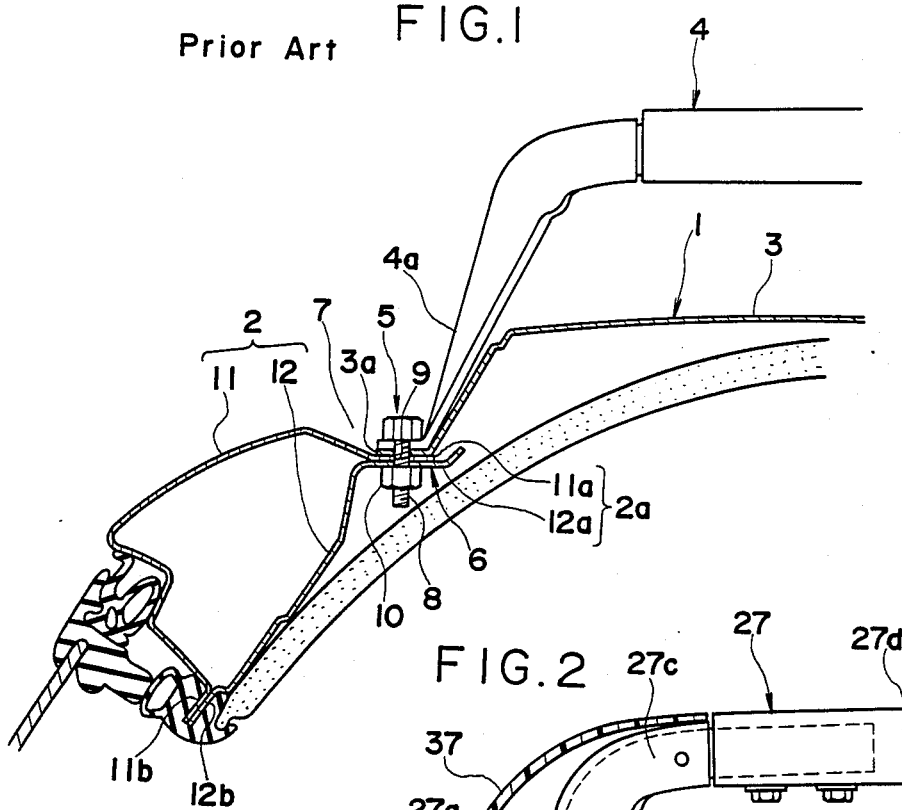
FIG. 1 is a fragmental sectional view of a car body roof, illustrating a conventional structure for detachably mounting roof carriers on a motorcar.
Figure 2:
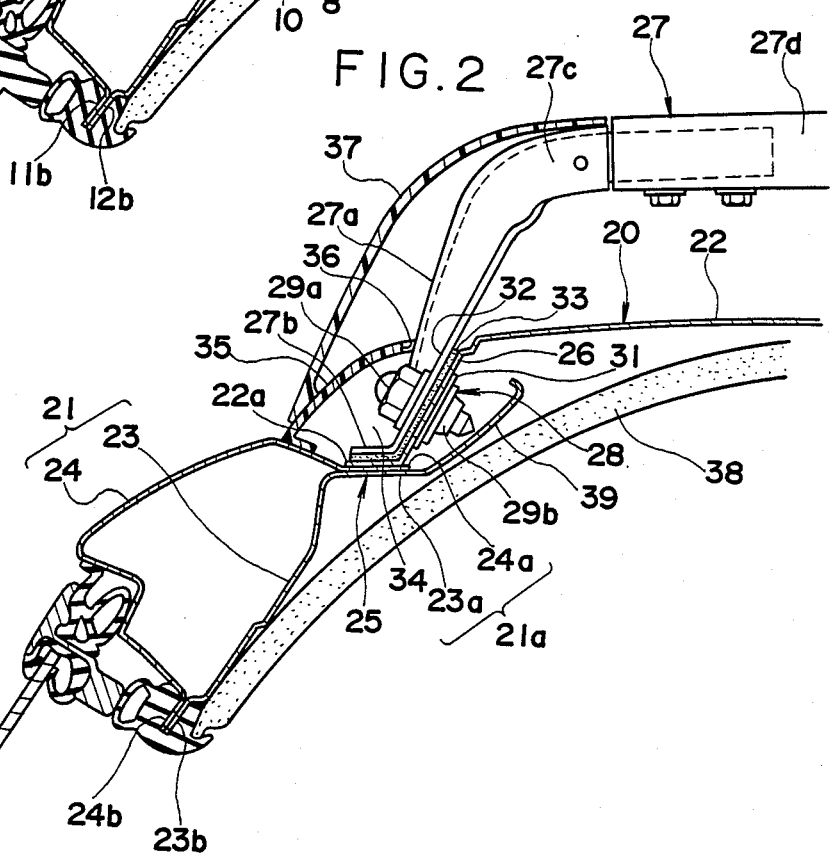
FIG. 2 is a fragmental sectional view of a car body roof, illustrating a structure for detachably mounting roof carriers on a motorcar in accordance with an embodiment of the invention.

FIG. 2 is a sectional view illustrating a structure for detachably mounting roof carriers on a motorcar in accordance with an embodiment of the invention. The drawing illustrates the left-hand side of a car body roof, and the right-hand part which is not shown in the drawing is arranged symmetrically with respect to the left-hand side.

Figure 3:
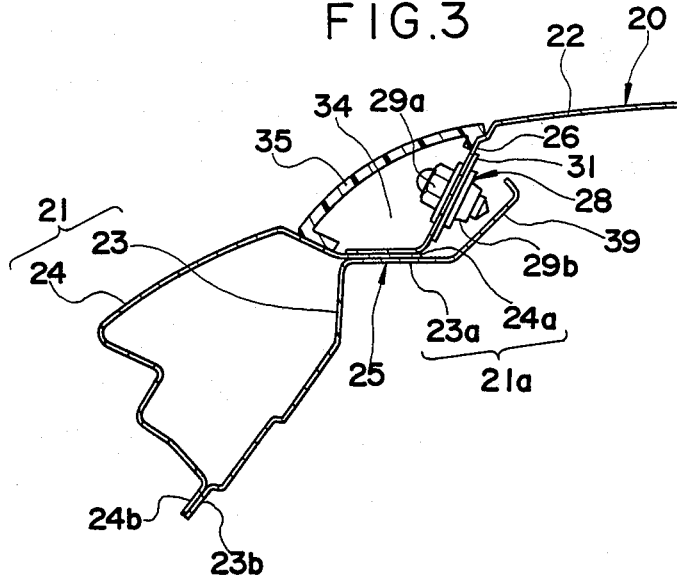
FIG. 3 is a sectional view similar to FIG. 2 but in which the roof carrier is not mounted to the motorcar.
Figure 4:
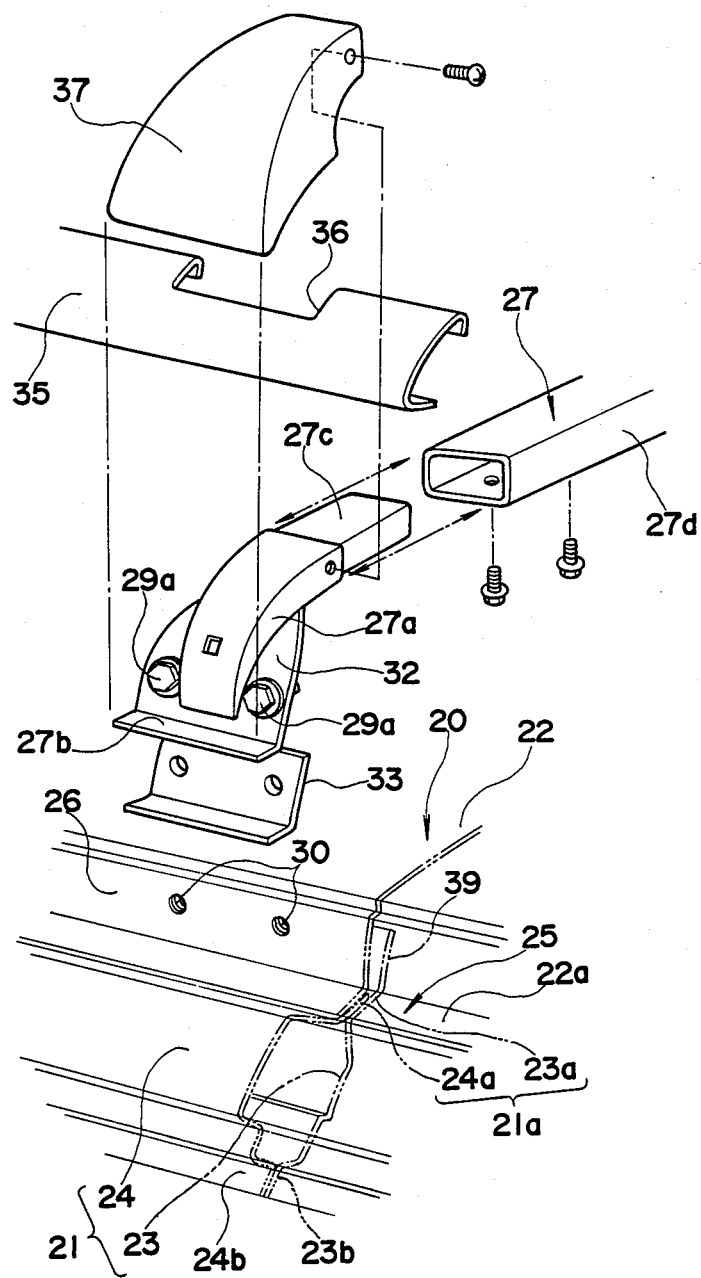
FIG. 4 is an exploded perspective view of the structure shown in FIG. 2.

As shown in FIGS. 2 to 4, a roof 20 comprises roof side rails 21 disposed in the longitudinal direction of the car body and on both sides of the latter and a main roof panel 22 spanning the roof side rails 21 so as to extend at the central part of the car body. Each of the side edges 22a of the main roof panel 22 is superposed on and welded to an inner edge 21a of the roof side rail 21.

The roof side rail 21 serves as a structural member for the car body and comprises a roof side inner panel 23 and a roof side outer panel 24. An inner end 24a of the roof side outer panel 24 is fixedly superposed on an inner end 23a of the roof side inner panel 23 while an outer end 24b of the roof side outer panel 24 is fixedly superposed on an outer end 23b of the roof side inner panel 23, in such a manner as to form a hollow space therebetween. Thus, the three panels 22, 23 and 24 are fixedly superposed one above another at a joint 25 where the inner edge 21a of the roof side rail 21 is joined to the side end 22a of the main roof panel 22. These three panels are welded together at the same time when the roof 20 is assembled. Furthermore, the roof side outer panel 24 constitutes an outer shell of the roof 20 that is disposed at the side thereof, and the side edge 22a of the main roof panel 22 is fixedly superposed on the inner end 24a of the roof outer panel 24.

As is apparent from the drawing, a vertical wall 26 extending in the vertical direction of the car body is formed by bending the main roof panel 22 at the side thereof upwardly from the joint 25 where the roof side rail 21 is joined to the main roof panel 22. As a result, the main roof panel 22 forms what is known as a high roof. The vertical wall 26 includes a fixing portion 28 onto which a mounting bracket 27a of the roof carrier 27 is detachably fixed at the outer surface of the vertical wall 26. Specifically, the fixing portion 28 comprises holes 30 formed through the main roof panel 22, a reinforcement plate 31 welded to the inner surface of the main roof panel 22 to reinforce the peripheral area of the main roof panel surrounding the holes 30 and nuts 29b integrally welded to the reinforcement plate 31 in proper alignment with the holes 30.

On the other hand, the mounting bracket 27a of the roof carrier 27 is integrally provided with a mount seat 32 by which the mounting bracket 27a of the roof carrier 27 is attached to the fixing portion 28. The mount seat 32 is so shaped that it closely contacts the outer surface of the vertical wall 26. Furthermore, the mount seat 32 is provided with a through hole (not shown) through which bolts 29a are inserted for securing mounting bracket 27a to the roof 20. The end of the seat 12 extends outwardly in the widthwise direction of the car body to form a flange 27b which is seated on the joint portion 25 of the three panels 22, 23 and 24. The mounting bracket 27a of the roof carrier 27 is fixedly secured to the roof 20 by fastening the seat 32 to the vertical wall 26 by means of bolts 29a. Reference numeral 33 designates a rubber seal disposed between the mount seat 32 and the main roof panel 22 in order to protect the surface of the main roof panel 22 and to prevent foreign material such as rain water or the like from entering into the passenger compartment through the fixing portion 28.

As shown in the drawing, a longitudinally extending groove 34 defined by the joint 25 of the panels 22, 23 and 24 and the vertical wall 26 of the main roof panel 22, is covered by a molding 35 which smoothly extends from the upper end of the vertical wall 26 of the main roof panel 22 to the roof side outer panel 24 at a location disposed outwardly of the joint 25, irrespective of whether or not the roof carrier 27 is mounted. In the illustrated embodiment, the molding 35 is divided into a plurality of segments and the segment covering the fixing portion 28 for securing the mounting bracket 27a of the roof carrier 27 is adapted to be easily attached to or detached from the roof 20. When the roof carrier 27 is mounted, the segment having a recess 36 extending therein is employed so as to permit the mounting bracket 27a of the roof carrier 27 to extend through the recess 36 (see FIG. 4). On the other hand, when the roof carrier 27 is not mounted, a segment not having a recess is employed (see FIG. 3). If desired, unitary moldings may be used so that an entire molding not having a recess can be replaced with one having recesses when the roof carrier 27 is mounted.

As shown in FIGS. 2 and 4 in which the roof carrier 27 is mounted, a side cover 37 adapted to enclose the mounting bracket 27a is attached to the latter whereby the external appearance of the roof is enhanced when the roof carrier 27 is mounted.

The roof carrier 27 comprises a base portion 27c including the mounting bracket 27a and a hollow rod-shaped body portion 27d formed separately from the base portion 27c. The assembling of the roof carrier 27 is achieved by inserting the inner end of the base portion 27c into the open end of the body portion 27d. In order to allow the length of the roof carrier to be adjusted over the width of the car body, the body portion 27d is slidable relative to the base portion 27c and the positioning of the body portion 27d on the base portion 27c can be achieved with the use of screws as shown in the drawings.

The dead weight of the roof carrier 27 and the weight of cargo placed thereon is transmitted to the roof 20 via the mounting brackets 27a of the roof carrier 27, but such a load is distributed over a wide area including the joint 25 of the panels 22, 23 and 24 and the vertical wall 26 of the main roof panel 22. Thus, with the structure of the present invention, there is no need to reinforce the joint 25 of the three panels 22, 23 and 24 with a long reinforcement member such as a carrier base member or the like as is required for reinforcing the joint in the conventional structure. In the present invention, a comparatively small reinforcement plate 31 is sufficient to reinforce the peripheral area of the vertical wall 26 surrounding holes 30. Furthermore, since the fixing portion 28 at which the mounting bracket 27a of the roof carrier 27 is fixed to the body roof 20 is provided on the vertical wall 26 of the main roof panel 22, there is no need to take into account the positioning of the fixing portion 28 during the assembling of the body roof 20, even though the fixing portion 28 has been assembled on the main roof panel 22 before the body roof 20 is assembled. This means that positional accuracy required at the time when the panels 22, 23 and 24 are joined one above the outer during the assembling of the body roof 20 can be relatively small, resulting in productivity being relatively large.

Incidentally, in the illustrated embodiment, the inner end 23a of the roof side inner panel 23 has an extension 39 extending to a position located below the vertical wall 26 of the main roof panel 22. This extension 39 serves as a water receiving tray which prevents water such as rain water or the like leaking through the threaded part of the bolts 29a and the nuts 29b from falling down on a ceiling 38 of the passenger compartment. Alternatively, the invasion of water does not take place by employing cap nuts instead of the nuts 29b, and thus, there is no need to provide the extension 39.

Figure 5:
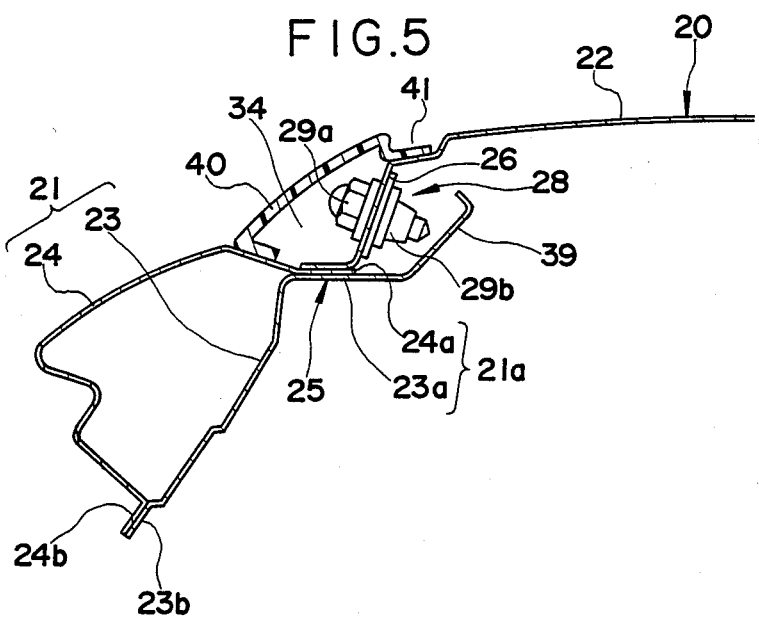
FIGS. 5 and 6 are fragmental sectional views of the car body roof, illustrating modified examples of a molding employed in the structure.
Figure 6:
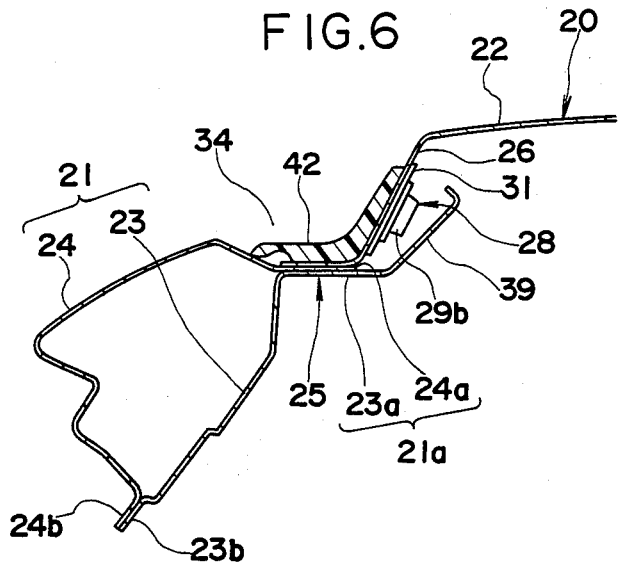

FIGS. 5 and 6 illustrate modified examples of the molding, respectively. A molding 40 as shown in FIG. 5 defines, in cooperation with the main roof panel 22, a draining groove 41 which extends along the upper end of the vertical wall 26 in order that rain water or the like can be drained along the groove 41. A molding 42, as shown in FIG. 6, is mounted in the longitudinal groove 34 by attaching it in close contact with the joint 25 of the three panels 22, 23 and 24 and the vertical wall 26, the molding extending along the entire length of the joint 25.

Figure 7:
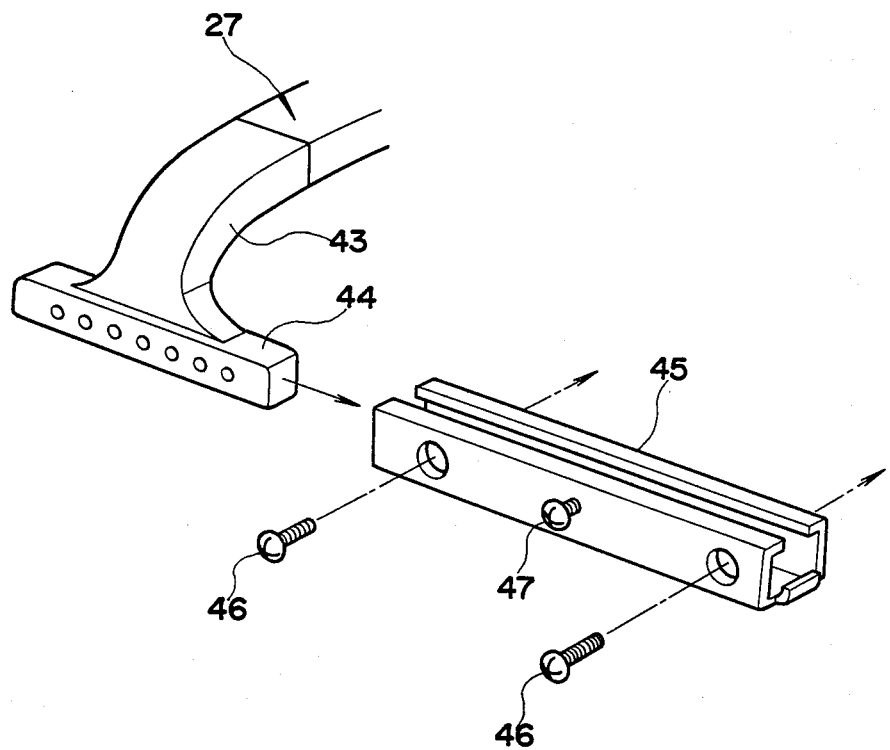
FIG. 7 is a perspective view illustrating a modified example of a mounting bracket of the roof carrier.
Figure 8:
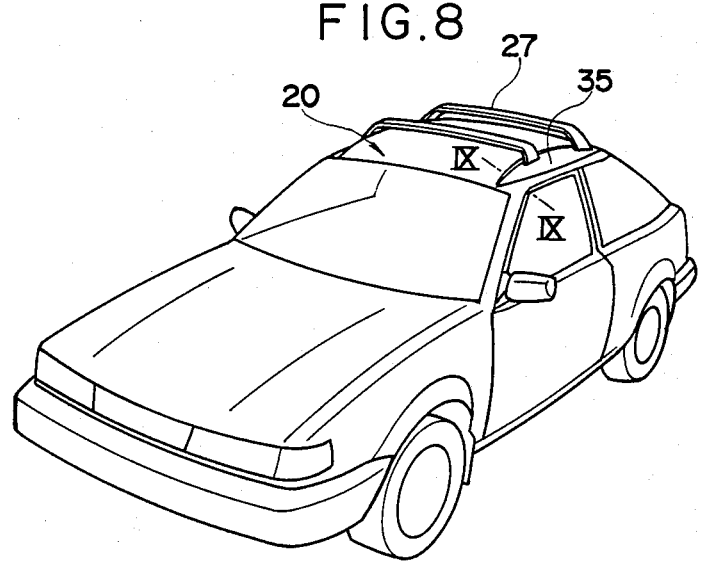
FIG. 8 is a schematic perspective view of a motorcar with two roof carriers mounted thereon via the structure shown in FIG. 2.

FIG. 7 illustrates a modified example of the mounting bracket of the roof carrier 27. As is apparent from the drawing, a mounting bracket 43 is integrally provided at its lower end with a longitudinally extending block 44 which is adapted to be inserted into a support rail 45. The support rail 45 is secured to the outer surface of the vertical wall 26 of the main roof panel 22 by means of screws 46. The block 44 is secured to or released from the rail 45 by slidably displacing the block 44 in the longitudinal direction of the car body. After the block 44 is inserted in the rail 45, it is firmly positioned by tightening screws 47.

Figure 9:
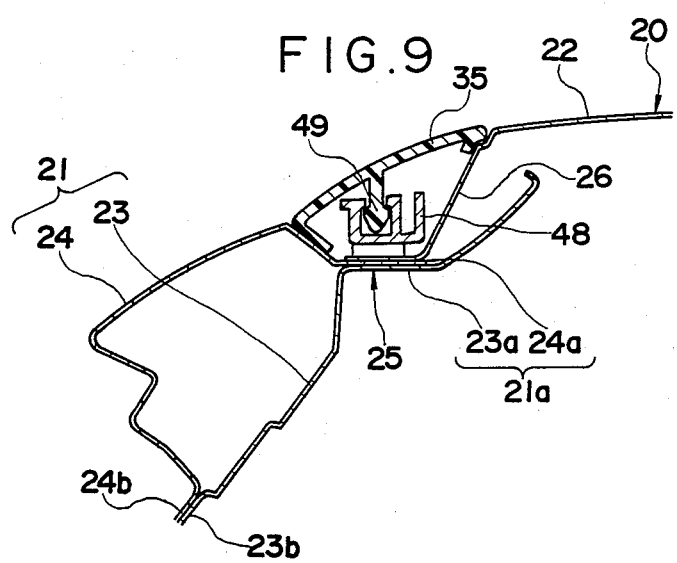
FIG. 9 is a sectional view taken along line IX—IX in FIG. 8.

FIG. 9 illustrates an example of means for securing the molding 35 in FIG. 2. In the illustrated example, a clip member 48 is fixed on the joint 25 at a position located forward of the mounting bracket of the roof carrier. The molding 35 is detachably mounted on the roof 20 through the engagement of a projection 49 formed on the lower surface of the mold 35 with the clip member 48. Several clip members 48 and projections 49 are provided at suitable intervals.

Figure 10:
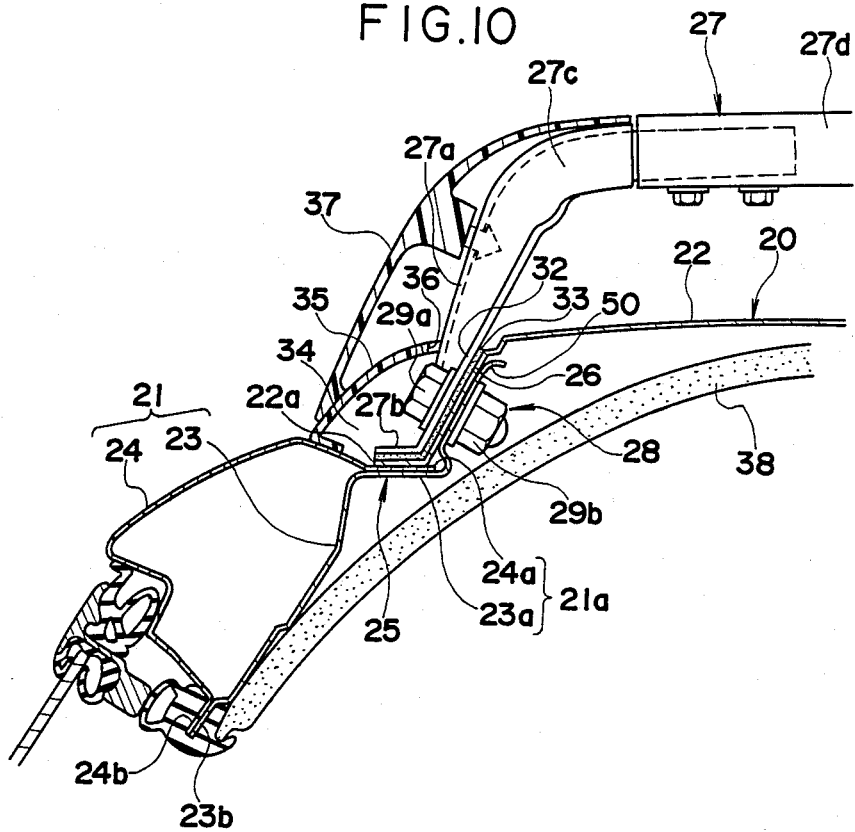
FIG. 10 is a fragmental sectional view of a car body roof, illustrating a structure for detachably mounting roof carriers on a motorcar in accordance with another embodiment of the invention.
Figure 11:
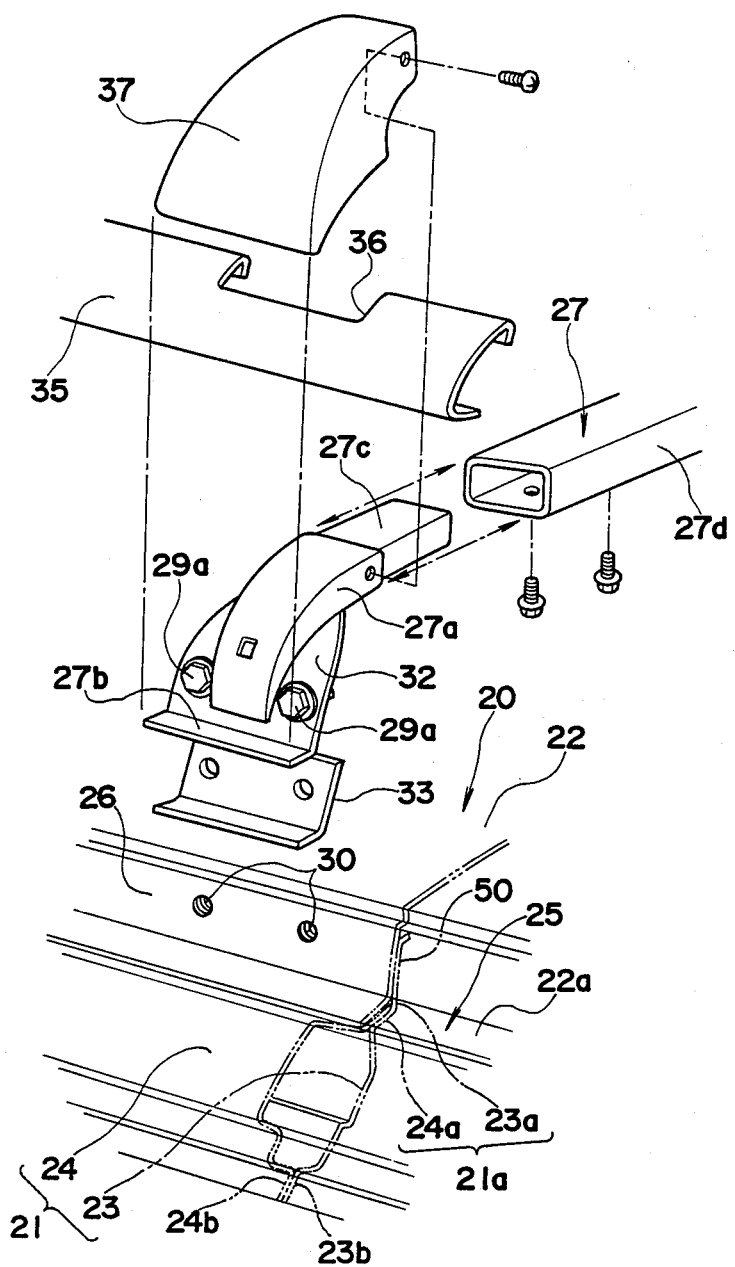
FIG. 11 is an exploded perspective view of the structure shown in FIG. 10.

Next, with reference to FIGS. 10 and 11, a structure for mounting roof carriers in accordance with another embodiment of the invention will be described. Same or similar parts or components to those in the preceding embodiment are represented by the same reference numerals and a description thereof will be omitted.

In this embodiment, an inner end 23a of the inner panel 23 constituting a roof side rail 21 cooperates with an outer panel 24 and extends along the vertical wall 26 of the main roof panel 22 in such a manner that extension 50 is superposed on and welded to the inner surface of the vertical wall 26. It is to be noted that the entire surface of the extension 50 need not be superposed on the vertical wall 26 as it would be sufficient for the extension 50 to be superposed on the vertical wall 26 only at the fixing portion 28. The hole 30 in the fixing portion 28 is formed through the vertical wall 26 in the same manner as in the preceding embodiment and moreover it also extends through the extension 50. The nut 29b adapted to be threadingly engaged with the bolt 29a is welded to the inner surface of the extension 50. In order to prevent water leakage, it is preferable that a cap nut be employed as the nut 29b. The mounting bracket 27a of the roof carrier 27 is firmly mounted on the roof 20 by fastening the seat 32 to the fixing portion 28 by means of the bolt 29a in the same manner as in the preceding embodiment. The extension 50 functions to reinforce the vertical wall 26. Accordingly, in this embodiment, a reinforcement plate as employed in the preceding embodiment is not provided.

With respect to the structure for mounting roof carriers as constructed in the above-described manner, it is necessary to take into account the correct positioning of the fixing portion 28, i.e. the holes 30, previously formed in the vertical wall 26 of the main roof panel 22 and the extension 50 of the roof side inner panel 23, when the roof 20 is assembled. However, since correct positioning is required for only two members, i.e. the panels 22 and 23, as compared with correct positioning required for three panels in the conventional structure, a relatively low degree of positional accuracy is required when the panels 22, 23 and 24 are joined one above another during the assembling of the roof 20, resulting in a relatively high degree of productivity being assured.

Figure 12:
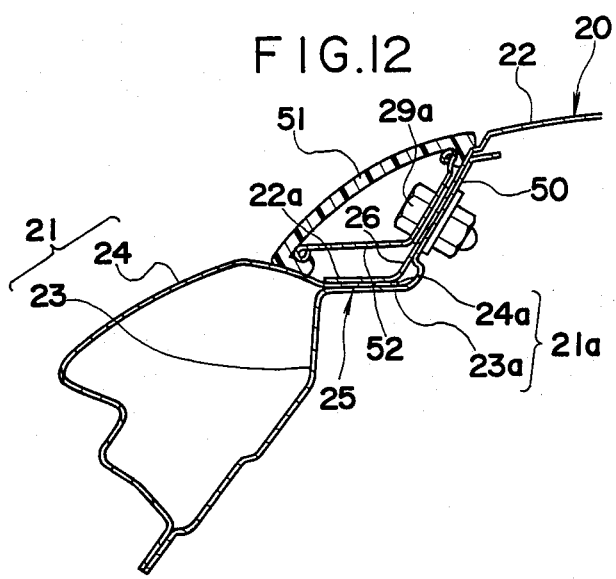
FIG. 12 is a fragmental sectional view of the structure in FIG. 10, illustrating engaging means for engaging a molding of the structure.
Figure 13:
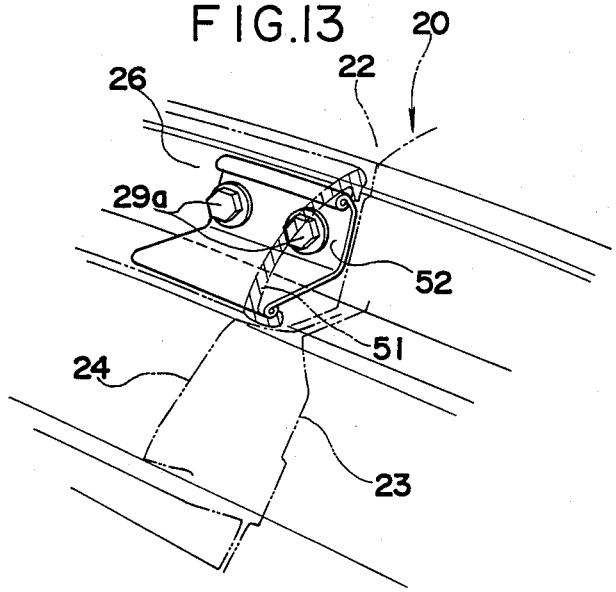
FIG. 13 is a perspective view of the engaging means.

FIGS. 12 and 13 illustrate a molding 51 that is attached while roof carriers are not mounted on the roof. As shown in the drawings, when the roof carriers are not mounted on the body roof, an engagement member 52 made of a leaf spring is fastened to the outer surface of the vertical wall 26 by means of bolts 29a so that the molding 51 is firmly held between the roof side outer panel 24 and the main roof panel 22 under the resilient force exerted by the engagement member 52.

Incidentally, it should of course be understood that the molding as shown in FIGS. 5 and 6 may be employed in this embodiment. Furthermore, the structure should not be limited to the embodiment in which the extension adapted to be superposed on the vertical wall 26 is provided on the inner panel 23. Alternatively, the inner end 24a of the outer panel 24 may provide an extension.

As will be readily apparent from the description above, in the present invention vertical walls are formed on both sides of a main roof panel and a fixing portion is provided on each of the vertical walls for fixing the mounting bracket of a roof carrier. Therefore, a relatively low degree of positional accuracy is required for correct positioning of the main roof panel relative to the side rail inner and outer panels during the assembling of the roof. As a result, it becomes possible to realize a relatively high degree of productivity in the manufacture of the roof.

While the present invention has been described above with respect to the preferred embodiments thereof, it should of course be understood that the description should not be construed a limitative but various changes or modifications may be made without departing from the scope of the invention as defined by the appended claims.

What is claimed is:

1. In structure for detachably mounting a roof carrier for supporting cargo to the roof of a vehicle, the improvement comprising:

the roof including a respective roof side outer panel extending longitudinally of the vehicle at each side thereof and having inner and outer ends, a respective roof side inner panel extending longitudinally of the vehicle at each side thereof and having inner and outer ends attached, respectively, to the inner and outer ends of a respective said roof side outer panel so as to define therewith roof side rails extending longitudinally of the vehicle at each side thereof having respective inner ends defined at the attached inner ends of said roof side inner and said roof side outer panels, and a main roof panel spanning said roof side rails, said main roof panel including end portions respectively superposed and attached to the inner ends of said roof side rails, a vertical wall extending generally vertically upwardly from each respective one of said end portions, and a respective fixing means disposed on each said vertical wall for detachably securing a mounting bracket of a roof carrier to the roof; and a respective mounting bracket detachably secured by each said fixing means to the roof.

2. The improvement in a structure for detachably mounting a roof carrier to the roof of a vehicle as claimed in claim 1, wherein a respective groove is defined between each of said roof side rails and said roof main panel, each said groove extending longitudinally of the vehicle and having a bottom defined by the inner end of a respective one of said roof side rails, and each said mounting bracket has a lower end resting on the inner end of a respective one of said roof side rails defining the bottom of a respective said groove.

3. The improvement in a structure for detachably mounting a roof carrier to the roof of a vehicle as claimed in claim 1, wherein one of the roof side inner and the roof side outer panels of each of said roof side rails includes an extension extending from the inner end thereof along an inner surface of a respective said vertical wall, said extension secured to the respective said vertical wall and superposed with at least said fixing means disposed thereon.

4. The improvement in a structure for detachably mounting a roof carrier to the roof of a vehicle as claimed in claim 2, wherein one of the roof side inner and the roof side outer panels of each of said roof side rails includes an extension extending from the inner end thereof and spaced across from a respective said vertical wall in a confronting relationship with a fixing means disposed thereon.

5. The improvement in a structure for detachably mounting a roof carrier to the roof of a vehicle as claimed in claim 2, and further comprising a respective molding extending between said main roof panel and each of said roof side rails so as to cover each said groove, respectively, each said molding having a recess through which a said respective mounting bracket extends.

6. The improvement in a structure for detachably mounting a roof carrier to the roof of a vehicle as claimed in claim 5, and further comprising a respective side cover enclosing each said respective mounting bracket.

7. The improvement in a structure for detachably mounting a roof carrier to the roof of a vehicle as claimed in claim 2, wherein each said vertical wall has a hole extending therethrough, and each said fixing means comprises a said hole and a bolt cooperating therewith.

8. The improvement in a structure for detachably mounting a roof carrier to the roof of a vehicle as claimed in claim 2,
wherein each said mounting bracket includes a body portion, and each said fixing means includes a base,
said base having means for slidably receiving said body portion.

9. The improvement in a structure for detachably mounting a roof carrier to the roof of a vehicle as claimed in claim 2,
wherein one of the roof side inner and the roof side outer panels of each of said roof side rails includes an extension extending from the inner end thereof along an inner surface of a respective said vertical wall,
said extension secured to the respective said vertical wall and superposed with at least said fixing means disposed thereon.

10. The improvement in a structure for detachably mounting a roof carrier to the roof of a vehicle as claimed in claim 2,
wherein each said groove also extends transversely of the vehicle.

11. The improvement in a structure for detachably mounting a roof carrier to the roof of a vehicle as claimed in claim 2,
wherein the lower end of each said mounting bracket includes a flange extending along the bottom of a respective said groove in a direction transversely outwardly of the vehicle.

12. The improvement in a structure for detachably mounting a roof carrier to the roof of a vehicle as claimed in claim 1,
wherein one of the roof side inner and the roof side outer panels of each of said roof side rails terminates at a location at which the vertical wall attached to the roof side rail extends vertically upwardly.

13. The improvement in a structure for detachably mounting a roof carrier to the roof of a vehicle as claimed in claim 5,
and further comprising means for detachably securing each said molding between said main roof panel and a respective one of said roof side rails.

* * * * *